United States Patent

Ketelaars et al.

(10) Patent No.: US 7,746,375 B2
(45) Date of Patent: Jun. 29, 2010

(54) DIGITAL CAMERA WITH PANORAMA OR MOSAIC FUNCTIONALITY

(75) Inventors: Wilhelmus Sebastianus Marcus Maria Ketelaars, Eindhoven (NL); Arjen Boogaard, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 654 days.

(21) Appl. No.: 10/577,110

(22) PCT Filed: Oct. 22, 2004

(86) PCT No.: PCT/IB2004/052176

§ 371 (c)(1),
(2), (4) Date: Apr. 25, 2006

(87) PCT Pub. No.: WO2005/041564

PCT Pub. Date: May 6, 2005

(65) Prior Publication Data

US 2007/0085913 A1 Apr. 19, 2007

(30) Foreign Application Priority Data

Oct. 28, 2003 (EP) .................................. 03103989

(51) Int. Cl.
H04N 7/00 (2006.01)
H04N 5/225 (2006.01)
G06K 9/36 (2006.01)

(52) U.S. Cl. .................... 348/36; 348/39; 348/218.1; 382/284

(58) Field of Classification Search ............ 348/36–39, 348/218.1, 48, 50; 382/284; 396/322
See application file for complete search history.

(56) References Cited

U.S. PATENT DOCUMENTS

| 5,689,611 | A | * | 11/1997 | Ohta et al. ..................... 386/46 |
| 5,721,624 | A | * | 2/1998 | Kumashiro et al. ......... 358/450 |
| 5,999,662 | A | * | 12/1999 | Burt et al. .................... 382/284 |
| 6,009,190 | A | * | 12/1999 | Szeliski et al. ............. 382/154 |
| 6,075,905 | A | * | 6/2000 | Herman et al. .............. 382/284 |
| 6,233,004 | B1 | * | 5/2001 | Tanaka et al. ................ 348/48 |
| 6,304,284 | B1 | * | 10/2001 | Dunton et al. ................ 348/36 |
| 6,456,323 | B1 | * | 9/2002 | Mancuso et al. ......... 348/218.1 |
| 6,466,262 | B1 | * | 10/2002 | Miyatake et al. ........... 382/284 |
| 6,466,701 | B1 | * | 10/2002 | Ejiri et al. ................... 382/284 |
| 6,552,744 | B2 | * | 4/2003 | Chen ....................... 348/218.1 |
| 6,782,139 | B2 | * | 8/2004 | Bender et al. ............... 382/278 |
| 6,930,703 | B1 | * | 8/2005 | Hubel et al. .................. 348/37 |
| 6,978,051 | B2 | * | 12/2005 | Edwards .................... 382/284 |
| 7,133,068 | B2 | * | 11/2006 | Fisher et al. ............. 348/218.1 |

(Continued)

FOREIGN PATENT DOCUMENTS

EP 1379073 A1 1/2004

(Continued)

*Primary Examiner*—David L Ometz
*Assistant Examiner*—Richard M Bemben

(57) ABSTRACT

A digital camera has a memory and a scan-mode. In this mode, the camera takes a sequence of still pictures. A next one of the pictures in the sequence is selected for being stored in the memory based on an amount of overlap regarding a picture content with a previous one of the pictures stored in the memory. The camera processes the pictures stored in the memory so as to create a composite picture.

11 Claims, 3 Drawing Sheets

U.S. PATENT DOCUMENTS

| | | | |
|---|---|---|---|
| 7,145,596 B2 * | 12/2006 | Kitaguchi et al. | 348/218.1 |
| 7,292,261 B1 * | 11/2007 | Teo | 348/36 |
| 7,386,188 B2 * | 6/2008 | Peterson | 382/284 |
| 7,428,007 B2 * | 9/2008 | Kitaguchi et al. | 348/218.1 |
| 2001/0045986 A1 * | 11/2001 | Edwards | 348/239 |
| 2002/0030748 A1 | 3/2002 | Kitaguchi | |
| 2003/0095193 A1 * | 5/2003 | May et al. | 348/231.3 |
| 2004/0189849 A1 * | 9/2004 | Hofer | 348/333.03 |
| 2004/0233274 A1 * | 11/2004 | Uyttendaele et al. | 348/36 |
| 2004/0257384 A1 * | 12/2004 | Park et al. | 345/646 |

FOREIGN PATENT DOCUMENTS

| | | |
|---|---|---|
| WO | 0195109 A2 | 12/2001 |

\* cited by examiner

DIGITAL CAMERA WITH PANORAMA OR MOSAIC FUNCTIONALITY

FIELD OF THE INVENTION

The invention relates to an electronics device with a digital camera, and to a method of enabling to create a composite picture using a digital camera.

BACKGROUND ART

The digital, solid-state cameras are rapidly replacing the traditional analog cameras. Prices have come down to a mass-market level and features, unheard of in the conventional analog domain, are being added to give the user ever more control over the capturing process and the quality of the end-result. Currently, digital cameras are commercially available that have been designed for connecting to a PC in order to transfer image files. These files can include still image files (e.g., JPEG files) as well as motion video files (e.g., QuickTime files). Such a digital camera captures digital still images and motion video segments and stores the images using, e.g., Flash EPROM memory. Digital cameras also are increasingly more frequently integrated with other appliances. Devices such as mobile phones currently come equipped with camera chips as a standard feature. Market reports estimate that in 2002 about 20 million (20M) so-called "camera phones" were sold worldwide. The embedded digital camera enables to instantly share a snapshot with a remote party. A similar trend of designed-in camera chips has appeared in the PDA market. Solid-state cameras thus have become a commodity in the consumer electronics (CE) environment, i.e., the mass market, wherein brand owners try to distinguish their products by means of attractive features providing additional functionality.

An example of the above is discussed in US patent application publication 20030095193. This reference discloses creating a panoramic digital image by providing a digital camera having a memory and which is operable in a first mode for producing individual still digital images, and in a second mode for capturing a series of overlapping digital images to be used in constructing the panoramic digital image. The digital camera is mounted on a stand, rotated on the stand through a series of predetermined positions, and operated in the second mode to capture the series of overlapping digital images. The series of overlapping digital images corresponding to the panoramic digital image is stored in a predetermined location in the memory, and processed to stitch such images together to produce the panoramic digital image.

SUMMARY OF THE INVENTION

The known camera requires that the user accurately follow a specific procedure to create a panoramic image. In addition, the camera needs a tripod or other stable stand. The inventors propose a user-friendlier alternative to the known digital camera for creating a panoramic image. In order to capture an image of an object, e.g., a scene or a building facade, the inventors propose that the user scan the object with a single sweep of the camera while camera is taking pictures. Upon completing the sweep, the camera stitches the pictures taken so as to create a panorama or mosaic picture.

More specifically, the invention relates to a digital camera having a memory and an operational mode wherein the camera takes a sequence of still pictures. A next one of the pictures in the sequence is selected for being stored in the memory based on an amount of overlap regarding a picture content with a previous one of the pictures stored in the memory. The camera processes the pictures stored in the memory so as to create a composite picture, e.g., a panorama or mosaic picture. Preferably, the camera comprises a sensor for determining information representative of respective relative coordinates of the camera when taking respective ones of the pictures during the sweep. Such a sensor comprises, e.g., an accelerometer or tachometer from whose output the camera's positions can be obtained. The information can then be used for controlling the creating of the composite picture, e.g., if the sweep traces out a serpentine path to scan an object that is high as well as wide. The information can also be used to determine the next picture, for example in conjunction with information about the estimated distance between the camera and the relevant area of the scanned object. The latter distance can be automatically estimated based on, e.g., the focal settings of the camera with auto-focus functionality. Preferably, the camera comprises a detector for detecting an area in the composite picture lacking coverage by the sequence of pictures, e.g., for providing feedback to a user of the camera. If the camera has a viewer to let the user examine a picture after it has been taken, a reduced version of the composite picture created thus far can be rendered as well. Any gap is then easily spotted so that the user can take an additional picture to cover the gap. The user is guided to point the camera to the proper area, e.g., by overlaying in the viewer the real-time image, i.e., the image resulting from capturing at what the camera is being pointed, with parts of one or more pictures already taken that neighbor the gap.

In a further embodiment of the invention, the camera as specified above is embedded, or otherwise functionally integrated, with an electronic apparatus such as a mobile phone or palmtop computer or PDA.

One of the advantages of having the image processed at the camera is that the user can preview the result almost instantly in order to determine if the result is satisfactory. For example, with a two-dimensional sweep the user may have missed an area of the scanned object, for which a solution is provided above. Another advantage is that the camera of the invention is self-sufficient. Downloading the pictures taken to a PC and post-processing them on the PC is not required anymore. In this manner a low-cost digital camera with panorama and mosaic functionality is provided.

The invention also relates to a method of creating a composite picture using a digital camera. The method comprises taking a sequence of still pictures; and selecting a next one of the pictures in the sequence for being stored based on an amount of overlap of a picture content with a previous one of the pictures stored. Then the pictures stored are processed so as to create a composite picture. Preferably, the method comprises determining information representative of respective relative coordinates of the camera when taking respective ones of the pictures. The information is used for controlling the creating of the composite picture using a stitching algorithm and/or to determine the next picture to be stored. Preferably, the method comprises identifying an area in the composite picture lacking coverage by the pictures stored in the memory.

For completeness, reference is made to WO0195109 published for Rob Beuker and Marcel Breeuwer for METHOD AND APPARATUS FOR MERGING IMAGES INTO A COMPOSITE IMAGE. This patent document relates to an apparatus and a method for merging overlapping two-dimensional (2D) images, which are formed by an image pick-up device as projections of a three-dimensional (3D) scene. In particular, the merging includes image registration by projective transformation of one of the 2D images, the transformation being derived from corresponding feature found in both images. In order to achieve improved accuracy and stability, the coordinates of the corresponding feature points are chosen or are translated so that, on average, the numerical ranges of coordinate values are minimized. The apparatus includes an appropriately configured image processor or computer with an attached image acquisition device, which in one embodiment, is a diagnostic x-ray.

BRIEF DESCRIPTION OF THE DRAWING

The invention is explained in further detail, by way of example and with reference to the accompanying drawing wherein.

DETAILED EMBODIMENTS

Figure 1:
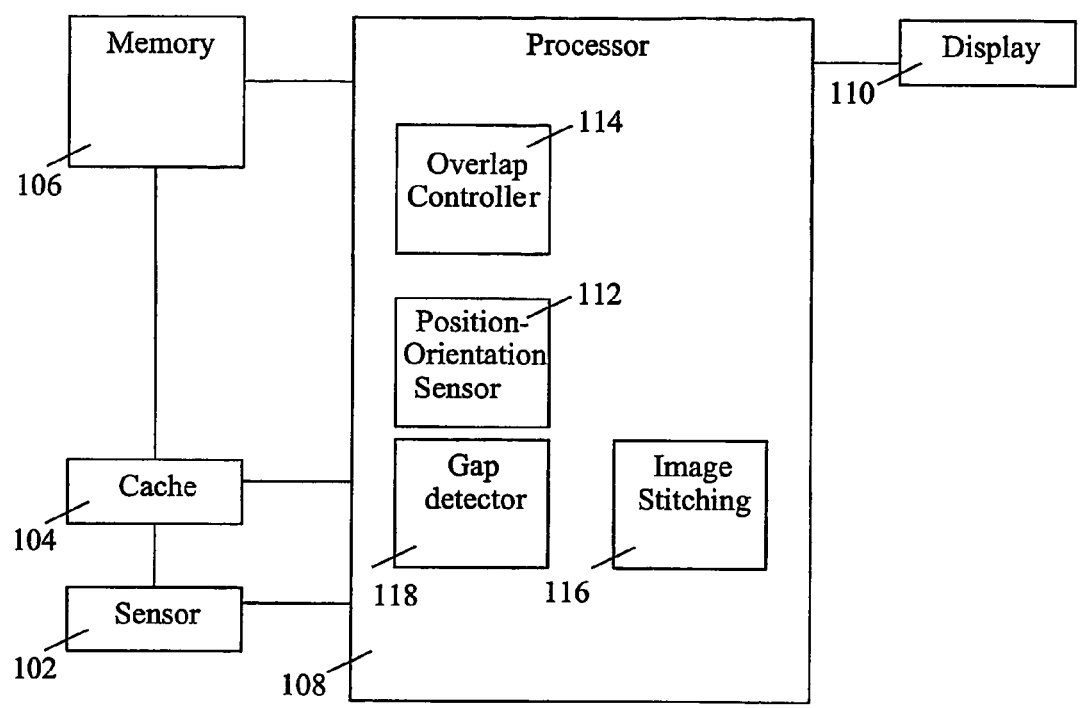
FIG. 1 is a block diagram of a camera in the invention.

FIG. 1 is a block diagram of a, preferably hand-held, digital camera 100 according to the invention. The camera in this example is a still-picture digital camera as opposed to a video camera. Camera 100 comprises an image sensor 102, a cache memory 104, a memory 106, a data processor 108 and a display monitor or viewer 110. Processor 108 comprises a position/orientation sensor 112, an overlap controller 114, image stitching software 116 and a gap detector 118.

Sensor 102 converts an optical image of an object into digital data and comprises a solid-state image-sensing element (not shown), such as a charge-coupled device (CCD). In case a CCD is used, sensor 102 includes an analog-to-digital converter (not shown) to convert the CCD's analog output signals to digital data. Sensor 102 is connected to cache 104 that stores the digital data from sensor 102. When the user depresses the camera's shutter button (not shown), processor 108 controls the CCD so as to perform a, so-called, all-pixel readout, wherein the data is temporarily stored in cache 104. From there, the data is transferred to memory 106 under control of processor 108. Memory 106 comprises, e.g., a removable memory card or a hard-disk drive (HDD) with a small form-factor, etc. Display 110 lets the user view the image as captured by sensor 102, e.g., while focusing or finding the proper object, as well as an image stored in memory 106. Operation thus far is similar to known digital cameras.

Camera 100 of the invention has an operational mode, referred to herein as "scan mode", wherein a sequence of images is captured that covers an area that is larger than can be captured in a single image using the camera's optical components (not shown here). To this end, the camera has to be moved and/or its orientation changed by the user so as to enable taking pictures that together cover the targeted area. Operation is as follows.

In the scan mode, the user sweeps camera 100 along a path for which the accumulated field of view is to cover a certain area. For example, the user sweeps camera 100 along a path from left to right that in order to capture, e.g., a large articulated steam locomotive on display at a museum, or from bottom to top to capture, e.g., a redwood tree. A first picture is taken that gets transferred to memory 106. During the sweep camera 100 keeps on taking pictures. The refresh rate of sensor 102 and cache 104 is such that multiple pictures can be taken during the sweep that overlap with the first picture given the typical speed at which a human can move his/her arm and wrist holding the camera. Overlap controller 114 determines the overlap of these subsequent pictures with the first picture and controls the transfer to memory 106 of the picture that has a certain minimum, or otherwise desired, amount of overlap. This last picture becomes the second picture. Camera 100 keeps taking pictures and overlap recognizer 114 similarly selects with respect to the second picture the third picture to be transferred to memory 106, and so on to the last picture. The last picture relates to the moment at which the scan mode is terminated by means of, e.g., the user releasing a button (not shown) kept depressed during the sweep and/or stopping the movement of the camera housing. In a simple horizontal sweep the order of the pictures in memory 106 is linear. Conventional stitching algorithms 116, known in the field of image processing, are run on processor 108 and create a composite picture from the series of overlapping pictures available from memory 106.

Controller 114 controls the overlap between successive pictures. Controller 114 is implemented, e.g., by an algorithm that seeks to match pixels of the successive pictures in the region of expected overlap. If sensor 112 senses camera 100 being moved to the right, and preferably also the current speed, and has also information about the scanned object's distance from the camera, the expected region of overlap can be minimized given the angle covered by the camera's lens (not shown). The distance previously mentioned can be estimated, based on, e.g., the focal settings. Sensor 112 comprises, e.g., a simple accelerometer, or a tachometer that determines the speed relative to the earth's magnetic field based on the Hall effect, etc. Alternatively, the relative velocity (virtual pixel displacement in a certain direction per unit of time) of pixels in a picture in cache 104 relative to the pixels in the last picture stored in memory 106 can be determined by means of subjecting subsequent pictures to a motion estimation algorithm known from video processing. As the amount of overlap depends on the velocity, the overlap can be determined.

The amount of desired overlap is preferably programmable, e.g., made automatically dependent on the lighting conditions, on the high-frequency components in the picture that represent details, or is user-selectable.

As another example, the user lets camera 100 trace out a serpentine-like path that substantially lies in a vertical plane to cover, e.g., a facade of an interesting structure or an object from close by. The ordering of the pictures taken is a linear one, but the linear order is to be mapped onto a two-dimensional array forming the eventual composite picture. Stitching now occurs at all four sides of a picture not at the perimeter of the two-dimensional area. This means that in order for the stitching to work, the relative two-dimensional position of each of the pictures, successively selected for transferal to memory 106, needs to be determined. To this end, camera 108 is equipped with position or orientation sensor 112 that enables to determine the path traced by camera 100 or the focal point of camera 100 during the serpentine sweep. Sensor 112 comprises, e.g., simple accelerometers (for vertical and for horizontal accelerations of the camera body and preferably also for determining the relative changes in pan and tilt angles) and circuitry to twice integrate over time the acceleration values found to determine the path. The pan or tilt motion can be determined using, e.g., pairs of accelerometers that register accelerations in opposite directions. Accordingly, a picture selected for transferal to memory 106 can get associated with a mark along this path including the relative vertical and horizontal coordinates. This enables to map the linear ordering onto the two-dimensional array.

Figure 2:
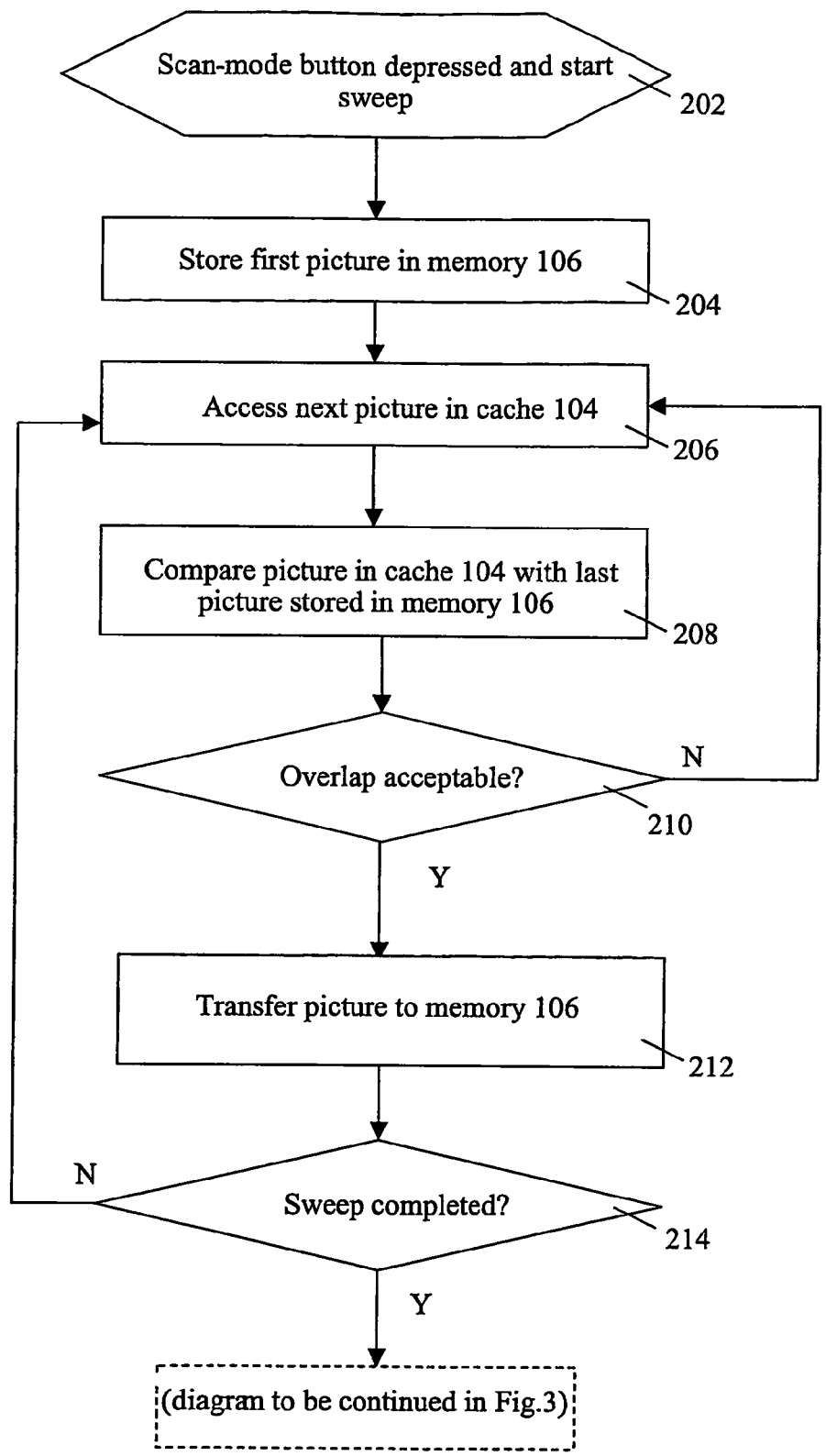
FIGS. 2 and 3 form a flow diagram illustrating a method of the invention; Throughout the figures, same reference numerals indicate similar or corresponding features.
Figure 3:
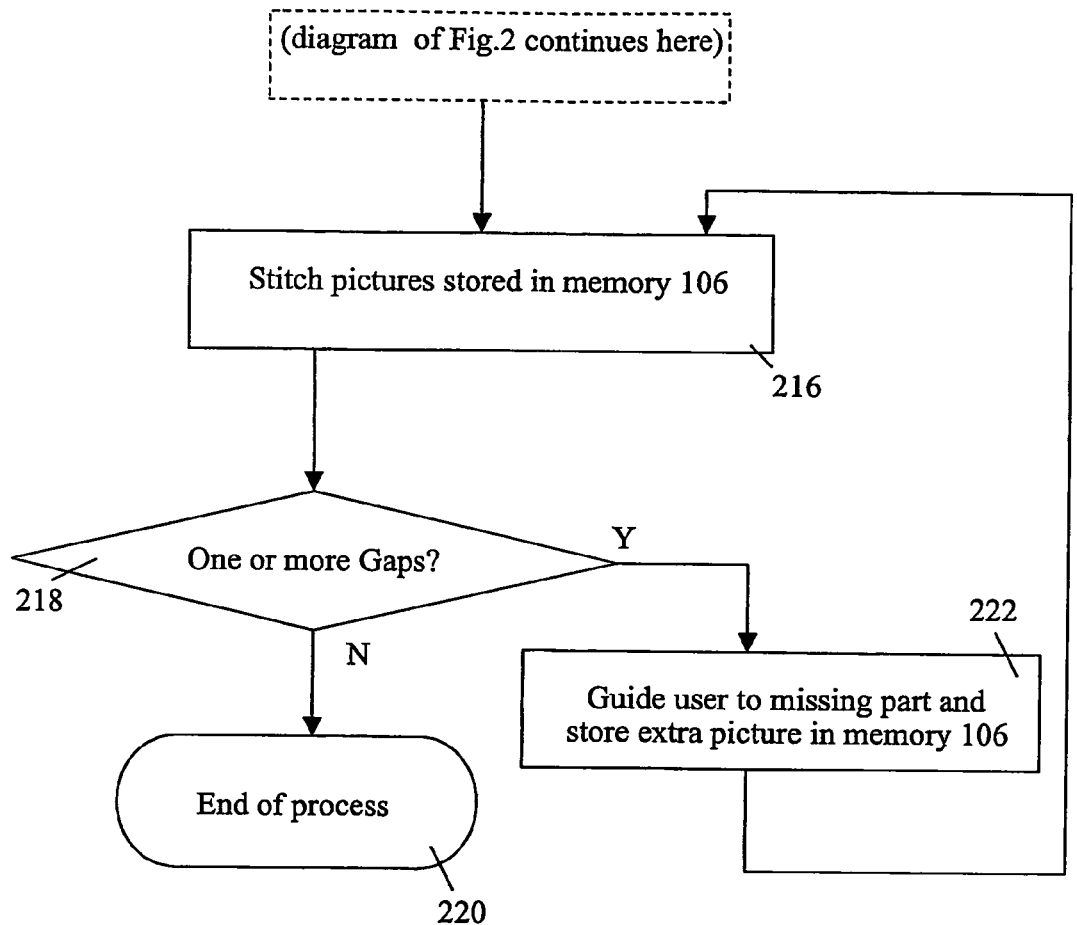

FIGS. 2 and 3 form a flow diagram illustrating a process 200 according to the invention. In a step 202, the user depresses a scan-mode button of camera 100, or otherwise causes camera 100 to enter the scan-mode, and starts the sweep. In a step 204, a first picture is taken and stored in memory 106. Camera 100 continues to take pictures. The next picture in cache 104 is accessed in a step 206 and compared in a step 208 with the first picture that is stored in memory 106. In a step 210, it is determined whether the picture currently in cache 104 has an acceptable overlap with the first picture. For example, if the overlap is large, it may be better to take a next picture, i.e., a split second later, that gets loaded into cache 104 to replace the previous picture buffered in cache 104. This helps to reduce the number of pictures needed for creating the composite image and makes efficient use of the camera's onboard storage 106. If the overlap is unacceptable, process 200 returns to step 206. If the overlap is acceptable, the picture currently in cache 104 is transferred to memory 106 in a step 212. In a step 214 it is determined if the sweep is completed. This is done, for example, by registering that the sweeping motion has stopped or that the camera's scan-mode button has been released. Alternatively, the user may have set the maximum number of pictures to be saved to memory 106 in a single sweep, etc. If the sweep is still ongoing, process 200 returns to step 206. If the sweep has finished, process 200 proceeds to a step 216 wherein the pictures accumulated in memory 106 are stitched to create the composite image, as discussed above. In a step 218, it is determined whether the composite image has one or more gaps, i.e., whether there are extended areas in the composite image wherein pixel data is lacking. If the areas are not extended in the sense that, e.g., simple interpolation from the area's perimeter can fill in the missing pixels (can be made a sub-routine of step 216), or if there are no gaps, process 200 is terminated in a step 220. If there is a gap process 200 goes to a step 222, wherein the user is guided to the missing area using, e.g., the overlay procedure mentioned above. Then, an extra picture is taken covering the missing area and transferred to memory 106. Thereupon, process 200 returns to step 216 to integrate the extra picture with the composite image created thus far. Note that in the overlay procedure the location of the extra picture, that is to be integrated, is already known.

As an alternative to starting the stitching together of the pictures in memory upon terminating the sweep, processor 108 decides on the coordinates of the pictures stored in memory 106 whether some or all of the pictures can already be stitched together during the sweep.

The invention claimed is:

1. A digital camera having a memory and an operational scan mode wherein:
   the camera takes a sequence of still pictures, which are temporarily stored in a cache, while sweeping the camera along a path;
   a first picture is stored in the memory;
   the amount of overlap between a next one of the pictures, from the cache, and said first picture is determined, wherein
   said next one of the pictures, from the cache, in the sequence is selected for being stored in the memory based on the amount of overlap regarding a picture content with said first picture stored in the memory; and
   the camera processes the pictures stored in the memory so as to create a composite picture and determines whether said composite picture includes an area lacking coverage by the pictures stored in said memory, wherein a content of said area is determined by interpolating-pixel data from edges of said area of said composite picture lacking coverage; and
   providing directions of said camera to a position to take at least one extra still picture to cover said area lacking coverage when interpolating pixel data from edges of said area of said composite picture lacking coverage fails to provide coverage of said area; and
   integrating said at least one extra still picture into said composite picture.

2. The camera of claim 1, comprising a sensor for determining information representative of respective relative coordinates of the camera when taking respective ones of the pictures.

3. The camera of claim 2, wherein the information is used for controlling the creating of the composite picture using a stitching algorithm.

4. The camera of claim 2, wherein the information is used to determine the next picture.

5. The camera of claim 1, comprising a detector for detecting said area in the composite picture lacking coverage by the pictures stored in the memory.

6. An electronic apparatus with the camera having a memory and an operational scan mode wherein:
   the camera takes a sequence of still pictures, which are temporarily stored in a cache, while sweeping the camera along a path;
   a first picture is stored in the memory;
   the amount of overlap between a next one of the pictures, from the cache, and said first picture is determined, wherein
   said next one of the pictures, from the cache, in the sequence is selected for being stored in the memory based on the amount of overlap regarding a picture content with said first picture; and
   the camera processes the pictures stored in the memory so as to create a composite picture and determines whether said composite picture includes an area lacking coverage by the pictures stored in said memory, and
   interpolating pixel data from edges of said area of said composite picture lacking coverage to provide coverage within said area and
   providing directions of said camera to a position to take at least one extra still picture to cover said area lacking coverage when interpolating pixel data from edges of said area of said composite picture lacking coverage fails to provide coverage within said area; and
   integrating said at least one extra still picture into said composite picture.

7. A method of creating a composite picture using a digital camera, the method comprising:
   taking a sequence of still pictures, which are temporarily stored in a cache, while sweeping the camera along a path;
   storing a first picture in a memory;
   determining the amount of overlap between a next one of the pictures, from the cache, with said first picture, wherein
   selecting said next one of the pictures, from the cache, in the sequence for being stored in the memory based on the amount of overlap of a picture content with said first picture;
   processing the pictures stored so as to create a composite picture;
   determining whether said composite picture includes an area lacking coverage by the pictures stored in said memory, and interpolating pixel data from edges of said area of said composite picture lacking coverage to provide coverage within said area; and providing directions of said camera to a position to cover said area lacking coverage, when interpolating pixel data from edges of said area of said composite picture lacking coverage fails to provide coverage within said area; and integrating said at least one extra still picture into said composite picture.

8. The method of claim 7, comprising determining information representative of respective relative coordinates of the camera when taking respective ones of the pictures.

9. The method of claim 8, comprising using the information for controlling the creating of the composite picture using a stitching algorithm.

10. The method of claim 8, using the information to determine the next picture.

11. The method of claim 7, comprising identifying an area in the composite picture lacking coverage by the pictures stored in the memory.

* * * * *